C. J. ROSS.
PROCESS OF MOLDING ARTICLES FROM DRY CEMENT CONCRETE.
APPLICATION FILED DEC. 10, 1919.
1,368,756.  Patented Feb. 15, 1921.
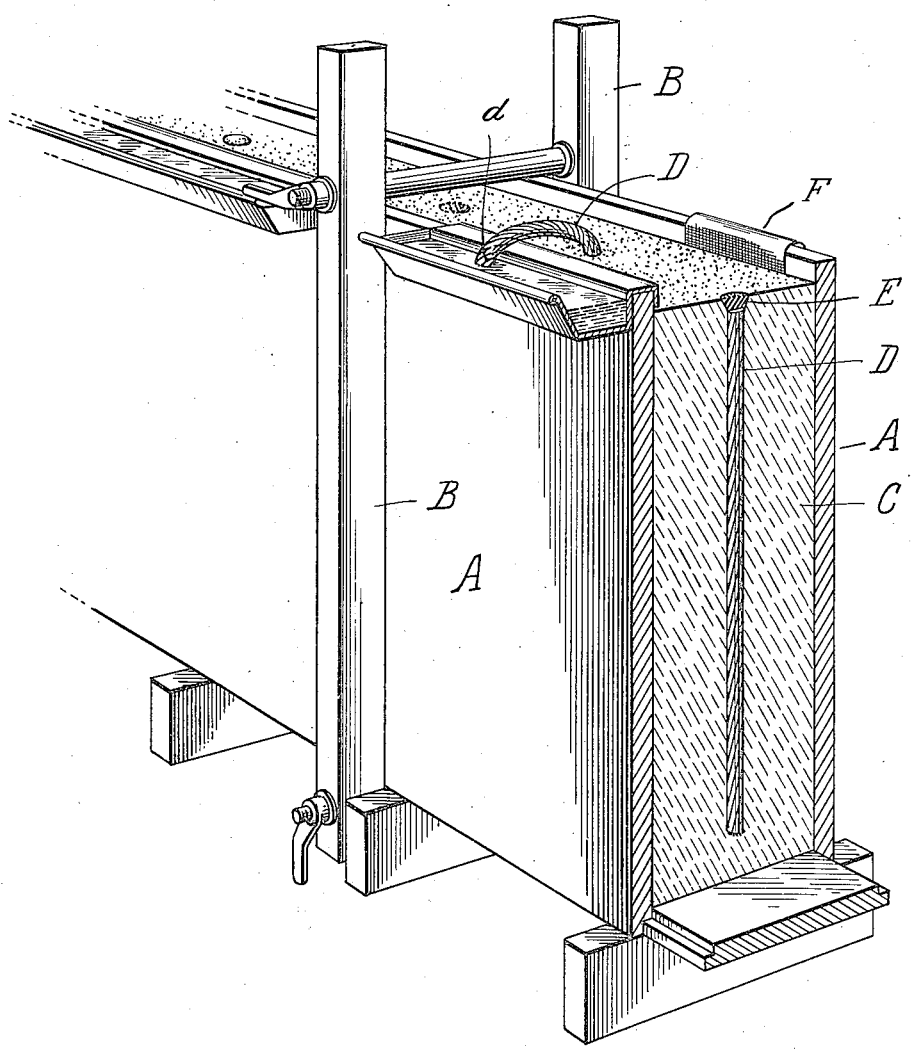
INVENTOR:
Colin John Ross
By Wm Wallace White, ATTY.

UNITED STATES PATENT OFFICE.

COLIN JOHN ROSS, OF LONGUEVILLE, NEAR SYDNEY, NEW SOUTH WALES, AUSTRALIA.

PROCESS OF MOLDING ARTICLES FROM DRY CEMENT CONCRETE.

1,368,756.

Specification of Letters Patent.   Patented Feb. 15, 1921.

Application filed December 10, 1919.  Serial No. 343,885.

*To all whom it may concern:*

Be it known that I, COLIN JOHN ROSS, of "Monomie," Lucretia avenue, Longueville, near Sydney, New South Wales, Australia, subject of the King of Great Britain and Ireland, have invented certain new and useful Improvements in Processes of Molding Articles from Dry Cement Concrete, of which the following is a specification.

In the manufacture of wall slabs and other structures and products in Portland cement or concrete, the ordinary practice is to mix water with the cement or the concrete aggregate and place the wet mixture in molds or forms to set; but in certain cases the dry material is placed in bags and submerged—as in marine works—and it has been proposed also to place the dry material in forms and to introduce water into it through pipes. For the making of test blocks, dry cement is packed in a mold and then wet without disturbance. It is known that a closer grained, harder, and stronger product is obtained when the cement or concrete is placed in a dry condition and wet *in situ* without disturbance, as thereby the formation of air pockets is avoided, the product is compacted by expansion in the setting, and the setting action, which commences promptly when water is applied, is not disturbed, and the fine lines of the mold are brought out. It has not, however, been realized that in the dry placing system a further advantage is attained in that Portland cement of fast setting composition may be used, rendering unnecessary the adulteration of the cement with set retarding substances such as calcium sulfate, the presence of which deteriorates the final product. It is a matter of considerable practical importance therefore to provide an efficient means of wetting cement and concrete uniformly throughout a mold without overwetting any portion of it or involving risk of washing out fine elements and soluble matter in the wetting operation, as does happen when the immersion or the water flowing method is adopted.

The essential feature of the present invention is the wetting of the mass of cement or concrete with water brought into it, by means dependent upon capillary action. The method of applying the invention must necessarily be adapted to a greater or less extent to meet special conditions in particular cases. Thus, the capillary ducts may be established during the mold filling operation or they may be formed after the mold has been filled and either before or after the dry material has been rammed, tamped, or otherwise compacted therein. In all cases the mixed dry material is caused to fill the mold or form so as to leave practically no voids before water is introduced into it.

The capillary ducts consist of strips, folds, strings, cords, or ropes of asbestos, jute, or other water absorbing material placed in the dry material at such distances apart as will insure absorption of water therefrom throughout the intervening masses, so that the whole mass shall become wet more or less uniformly without excess at any place which would wash out or liquefy the cementitious elements or any fine portions of the aggregate. Ordinarily, the capillary duct material consists of lengths of fibrous rope—jute for instance—symmetrically disposed at intervals of the order of twelve inches apart, these ropes having extra length to permit their upper ends being hung in a vessel containing water, with the object that said water will be drawn through them by capillarity and applied as a moistening or dampening to the cement or concrete surrounding them in the mold or form. Or strips of jute or like absorbent fabric may be set against the inner sides of the mold so that the wetting is effected from the superficies of the mass inwardly and not from the heart portion of it outwardly. Other capillary substances, such as sticks of porous earthenware, may be used instead of fabric materials to form capillary ducts. When a sufficiency of water has thus been introduced into the mass to procure the desired setting reaction, the capillary nature of the ducts is destroyed by charging them with an oily substance or by sealing the exposed ends after cutting off the excess length by applying thereto an unctuous or bituminous substance repellent to water.

The effectiveness of the process depends upon the dampening of the dry mass slowly and uniformly by absorption of water without head or flow, whereby all risk of overwetting and washing out is obviated, and the production of a perfect product is assured.

The annexed explanatory drawing is a perspective section through a wall or slab form having a mass of dry concrete mixture rammed therein and vertically disposed rope filled capillary ducts positioned therein at intervals. It shows also a mold liner of jute or like cloth F through which also water may be brought into the cementitious mass by capillarity. In this drawing, A are the mold sides, B mold frames, C the cement concrete mass, D absorbent fiber ropes. Water may be introduced into the ropes D or the cloth F by hanging their upper ends in a pan of water placed close to the top of the cast so as to minimize the lift and so facilitate capillary flow of water from the pan to the ropes or cloth; or the ropes or cloth may be served with water in any other way convenient in the circumstances so long as the water is permitted to pass by capillary action only and is not permitted to flow under head. It is important that the rate of water supply to the capillary ducts shall be limited to insure delivery of water therethrough into the cementitious mass at a rate no faster than will permit said mass to completely absorb it without showing any flooding. E represents the sealed over ends of the ropes D after same have been cut short and covered with greasy or bituminous material. The ducts may be disposed horizontally, vertically, or angularly, and should be located at such distances apart as will permit the concrete mass to absorb a sufficiency of water in the course of a few hours to procure the setting reaction to take place throughout it. In practice it is found that a duct packed with loose fibrous rope a quarter of an inch or less in diameter will serve a zone from eight to ten inches surrounding it.

What I claim as my invention and desire to secure by Letters Patent is:—

1. A process of setting Portland cement and concrete in molds and forms, which consists in filling the same in dry condition into said molds and slowly introducing water thereinto through ducts containing porous material functioning capillarily.

2. The herein described process of manufacture of slabs and other products in Portland cement and concrete, which consists in mixing the cementitious aggregate in a dry condition, filling and packing the same into molds or forms, leaving ducts or spaces therein at limited distances apart, filling said ducts with capillary material, and supplying water to said material by capillarity.

3. The herein described process of manufacture of slabs and other products in Portland cement and concrete, which consists in setting capillary elements at limited intervals apart in molds or forms, packing dry cementitious aggregate in said molds or forms so as to incase said capillary elements in the mass, and introducing water into the mass by capillary action through said capillary elements.

In testimony whereof I affix my signature.

COLIN JOHN ROSS.